Feb. 17, 1931.

C. D. MOSHER

PLATE AIR HEATER

Re. 17,973

Original Filed Dec. 31, 1927 2 Sheets-Sheet 1

Inventor:
Charles D. Mosher,
by Wright Brown Quinby & May
Atty's.

Feb. 17, 1931.
C. D. MOSHER
PLATE AIR HEATER
Re. 17,973
Original Filed Dec. 31, 1927 2 Sheets-Sheet 2
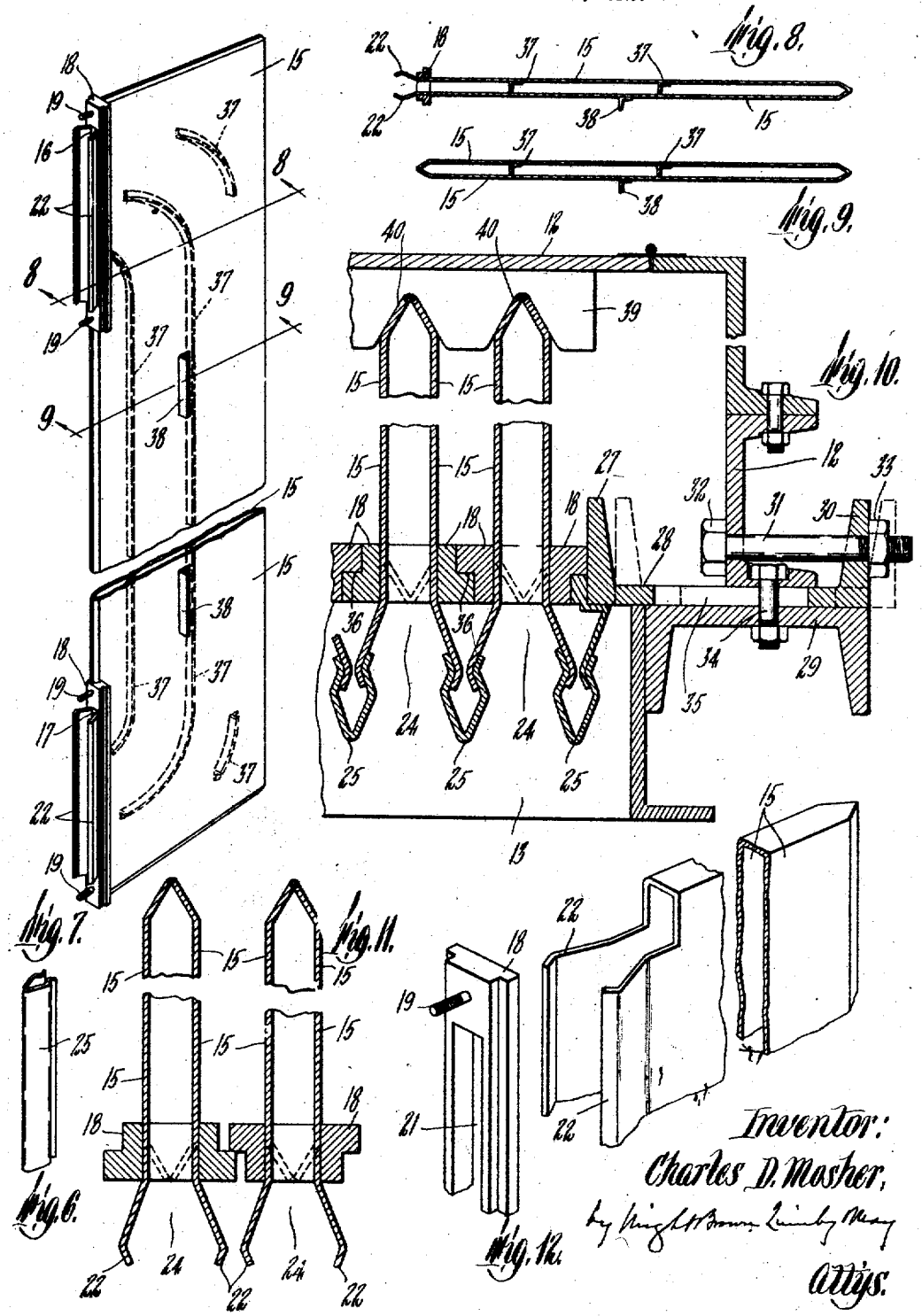
Inventor:
Charles D. Mosher,
by Wright Brown & Quinby Atty
Attys.

Reissued Feb. 17, 1931 Re. 17,973

UNITED STATES PATENT OFFICE

CHARLES D. MOSHER, OF HYDE PARK, MASSACHUSETTS, ASSIGNOR TO B. F. STURTEVANT COMPANY, OF BOSTON, MASSACHUSETTS, A CORPORATION OF MASSACHUSETTS

PLATE AIR HEATER

Original No. 1,692,562, dated November 20, 1928, Serial No. 243,895, filed December 31, 1927. Application for reissue filed June 12, 1930. Serial No. 460,763.

This invention relates to air-heating structures utilizing waste heat from a boiler furnace or other source, to heat air for a useful purpose.

The structure in which the invention is embodied is of the plate type, and comprises a gas-conducting casing adapted to receive hot gases at one end and discharge the same at the opposite end, and having large side openings at its upper and lower end portions, a group of air chambers extending side by side lengthwise of the casing, each chamber having relatively wide side plates, united at their edges to form a thin air passage, oblong in cross section, the chambers being provided at their end portions with ports registering with the casing openings, the arrangement being such that the casing is adapted to conduct hot gases upwardly between the chambers, while the chambers downwardly conduct air admitted to their upper ends through ports at the upper front ends of the chambers, heated air being discharged through ports at the lower forward or rear ends of the chambers.

The chief object of the invention is to provide an air-heating structure, the air chambers of which are adapted to be conveniently installed, with either end at the top, and reversed end to end after a period of use, so that when the upper end portions of the chambers are impaired by corrosion, due to the use of sulphurous fuel, this corrosion occurring chiefly at the cooler upper end portions, the chambers may be reversed to locate uncorroded portions thereof uppermost and thus practically double the life of the chambers.

Another object is to provide improved means associated with the ports of the chambers for filling the casing openings, to prevent leakage of gases from the casing around the ports.

Another object is to provide an improved construction of the chambers at the ports thereof, whereby tapering throats are formed to facilitate the flow of air into the ports at the upper end portions of the chambers.

Other related objects will hereinafter appear.

Figure 1:
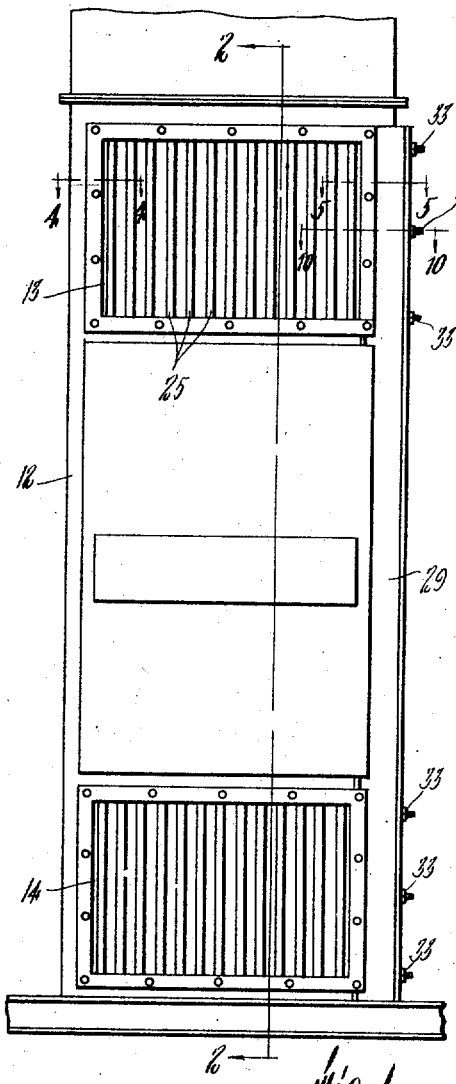
Figure 2:
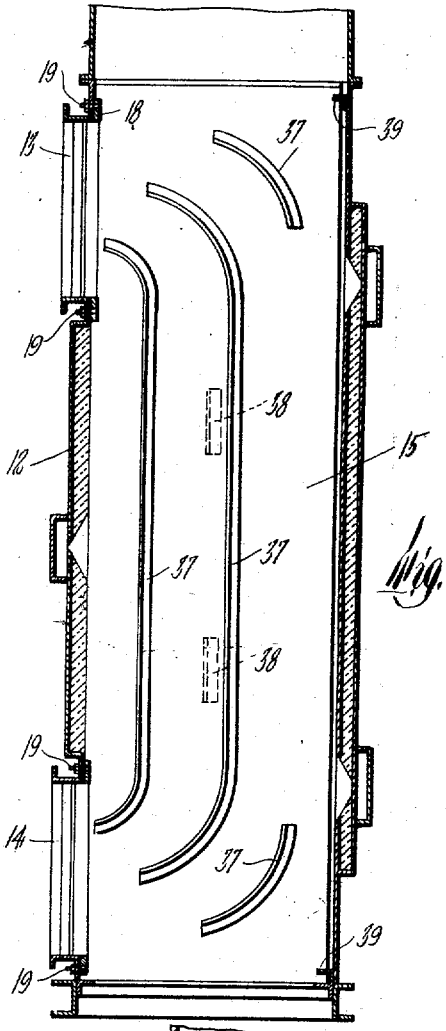
Figure 4:
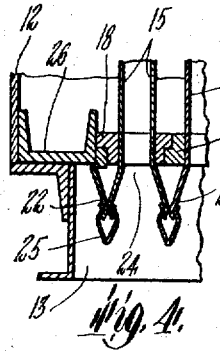
Figure 5:
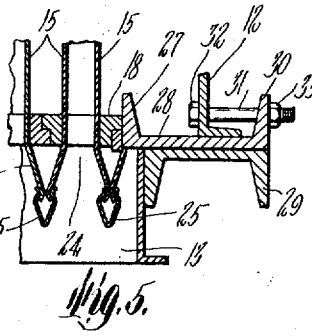
Figure 3:
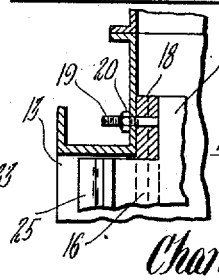

Of the accompanying drawings forming a part of this specification, Fig. 1 is a front elevation of an air heater embodying the invention; Fig. 2 is a longitudinal section on line 2—2 of Fig. 1; Fig. 3 is an enlargement of a portion of Fig. 2; Fig. 4 is a fragmentary section on line 4—4 of Fig. 1; Fig. 5 is a fragmentary section on line 5—5 of Fig. 1; Fig. 6 is a perspective view, showing one of the clips hereinafter described; Fig. 7 is a perspective view of one of the air chambers; Fig. 8 is a section on line 8—8 of Fig. 7; Fig. 9 is a section on line 9—9 of Fig. 7; Fig. 10 is an enlarged fragmentary section on line 10—10 of Fig. 1; Fig. 11 is a fragmentary section, showing two of the chambers; Fig. 12 shows in perspective portions of one of the chambers, and a portion of a filling member intended to be engaged with the chambers, as shown in Fig. 7.

The same reference characters indicate the same parts in all of the figures.

12 designates a vertically elongated gas-conducting casing, adapted to receive hot gases at its lower end, and discharge the same at its upper end. A large rectangular upper opening 13 is formed in the upper end portion of the casing, and a lower opening 14, of the same size and form, is formed in the lower end portion of the casing, the opening 13 admitting cool air to the upper ends of the chambers hereinafter described, and the lower opening permitting the discharge of hot air from the lower ends of said chambers.

Within the casing is a group of air chambers extending side by side lengthwise of the casing. Each chamber includes a pair of parallel rectangular plates 15, united at their edges, preferably by welding, to form a thin air passage, which is oblong in cross section. One longitudinal edge of the chamber has at its upper end portion an air inlet port at 16, registering with the upper casing opening 13, and an air outlet port 17, at its lower end portion registering with the lower casing opening 14.

The chambers are provided with filling members 18, a portion of one of which is shown separately by Figs. 11 and 12. Said members surround the ports and are formed to collectively close the casing openings around the chambers, and space the chambers apart, as shown by Fig. 10, the joints of said members being made up with plastic cement unaffected by heat.

I provide means adapted to detachably secure the chambers to the casing, so that they may be detached, reversed end for end, and again attached, the form of the chambers and the form and arrangement of the attaching means being such that the chambers are reversible. I prefer to embody the attaching means in tie bolts 19, connected with and projecting from the forward edges of the chambers, above and below the ports thereof, said bolts being adapted to enter holes formed for their reception in the casing, and provided with clamping nuts 20 (Fig. 3). In this instance, the bolts 19 are engaged directly with the filling members 18, as best shown by Figs. 3, 7 and 12. By the removal of the clamping nuts 20, which may be done without disturbing the inlet and outlet connections to the casing, and loosening the clamping abutment 27, the chambers may be freed or released from the casing so that they may be withdrawn from the back, the rear wall of the casing being pivoted as shown in Fig. 10 so that it may be opened for this purpose. Said filling members are, in this instance, provided with slots 21, receiving ears or wings 22, formed on the outer edges of the chambers and forming the opposite sides of the air ports. Said wings are of the angular form shown by Figs. 8, 10 and 11, and constitute diverging sides of throats 24 (Fig. 11), which facilitate the entrance of cool air into the upper ports of the chambers, and prevent the formation of air eddies outside the ports.

To extend the throats 24, I provide angular clips 25, formed as shown in Figs. 6 and 10, of sheet or plate metal, adapted to be sprung upon the angular ears 22, and connect the ears on adjacent air chambers.

The filling members 18 are abutted together, as shown by Figs. 10 and 11, and are separable from each other. Said members form a series filling the casing openings around the ports of the air chambers. One end member of the series contacts with a fixed abutment 26, (Fig. 4) on the casing. The opposite end member contacts with a movable clamping abutment 27 (Figs. 5 and 10), which is adjustable to clamp the filling members together and confine the air chambers suitably spaced apart.

The casing is provided with means for adjusting the abutment 27, preferably embodied in a slide 28, on which the abutment 27 is formed, said slide being movable on a guide 29, fixed to the casing and said slide being also provided with an ear 30, receiving a rod 31. The head 32 of the rod bears on the inner side of a portion of the casing 12, and a nut 33 engaged with a threaded portion of the rod bears on the ear 30. When the nut is turned in one direction, it moves the slide 28 to press the abutment 27 inwardly, and cause its clamping action. The slide is guided by a fixed bolt 34, passing through a slot 35 in the slide.

The abutting edges of its filling members 18 are preferably provided with interengaged shoulders 36, formed to maintain the members in alinement with each other, as shown by Figs. 10 and 11.

To prevent inward buckling of the plates 15, forming the sides of the air chambers, I secure to one plate of each chamber, longitudinally extending angle strips 37, bearing on the opposite plate.

One plate of each chamber may be provided with external angle strips or lugs 38, adapted to bear on an adjacent chamber and maintain the predetermined spacing between the chambers. One wall of the casing may be provided with a spacing strip 39, having notches 40 (Fig. 10) adapted to engage the vertical inner or rear edges of the air chambers, said edges being preferably V-shaped.

Having thus described the invention, what I claim is:

1. An air heater of the plate type, comprising a gas-conducting casing adapted to receive hot gases at one end and discharge the same at the opposite end, and having side openings at its end portions, a group of air chambers extending side by side lengthwise of the casing, each chamber including a pair of parallel rectangular plates united at their edges to form a thin air passage which is oblong in cross section, one longitudinal edge of the chamber having at one end portion an air inlet port registering with one of the casing openings, and at its opposite end portion an air outlet port registering with the other casing opening, and attaching means adapted to detachably secure the chambers to the casing, the form of the chambers and the attaching means permitting the reversal of the chambers end for end, the chambers being provided with filling members surrounding the ports and formed to collectively close the casing openings around the chambers and space the chambers apart, the arrangement being such that the casing is adapted to conduct hot gases in one direction between the chambers, while the chambers conduct air in the opposite direction from the inlet to the outlet port.

2. An air heater as specified by claim 1, the chamber attaching means being embodied in tie bolts engaged with and projecting from the edges of the chambers above and below the ports, and adapted to enter registering bolt holes in the casing and provided with clamping nuts.

3. An air heater as specified by claim 1, the filling members being separately abutted together edge to edge and forming a series filling the casing openings, one end member of the series contacting with a fixed abutment on the casing, the heater comprising also a movable clamping abutment bearing on the opposite end of the series, and means for adjusting said abutment to clamp the filling members together and confine the chambers in spaced apart relation.

4. An air heater as specified by claim 1, the abutting edges of the filling members being shouldered and interengaged to maintain the members in alinement.

5. An air heater as specified by claim 1, the chambers being provided with diverging angular wings projecting therefrom at opposite sides of the ports and forming the sides of tapering throats communicating with the chambers, the wings of adjacent chambers being connected by angular clips sprung upon the angular wings and forming extensions of said throats.

6. In an air heater of the class described, a casing, a plurality of air chambers detachably secured within said casing in a manner so that one or all of said chambers may be removed in their entirety or reversed upside down, and means for clamping said chambers together in spaced position.

7. An air heater having, in combination, a casing provided with symmetrically disposed inlet and outlet openings of equal size, a plurality of air chambers detachably secured within the casing, said chambers having symmetrically disposed inlet and outlet openings of equal size, and means for detachably securing the air chambers to the casing in spaced relation with the air chamber openings in register with the casing openings to permit the removal or reversal upside down of said entire chambers.

8. An air heater of the plate type, comprising a gas-conducting casing adapted to receive hot gases at one end and discharge the same at the opposite end, and having side openings at its end portions, a group of air chambers extending side by side lengthwise of the casing, each chamber including a pair of plates united at their edges to form a thin air passage, one longitudinal edge of the chamber having at one end portion an air inlet port registering with one of the casing openings, and at its opposite end portion an air outlet port registering with the other casing opening, and attaching means adapted to detachably secure the chambers to the casing, the form of the chambers and the attaching means permitting the reversal of the chambers end for end.

9. In an air heater of the class described, a casing provided with symmetrically disposed inlet and outlet openings and adapted to receive inlet and outlet connections, a plurality of air chambers detachably secured within said casing and provided with inlet and outlet openings adapted to register with said openings in the casing, and means for detachably securing the chambers in the casing so that one or more of said chambers may be removed in their entirety and reversed with respect to the inlet and outlet openings without disturbing the inlet and outlet connections on the casing.

10. An air heater of the plate type comprising a casing provided with gas receiving and gas discharge openings and having air inlet and air outlet openings, a group of air chambers extending side by side in the casing, each chamber including closely spaced side plates united at their edges to form a thin air passage and provided with edge ports for the inlet and discharge of the air, the ports registering with the air openings in the casing, filling members on the sides of the chambers adjacent the ports for spacing the chambers apart and preventing leakage between the chambers, and means for securing the chambers in position in the casing.

11. An air heater of the plate type comprising a gas conducting casing provided with gas receiving and gas discharge openings and having air inlet and air outlet openings, a group of air chambers extending side by side in the casing, each chamber including a pair of parallel, rectangular plates united at their edges to form a thin air passage which is oblong in cross-section, each chamber being provided with edge ports for the inlet and outlet of air, said ports registering with the air openings in the casings, and attaching means adapted to detachably secure the chambers to the casing, the chambers being provided with filling members surrounding the ports and formed to collectively close the casing openings around the chambers and space the chambers apart, the arrangement being such that the casing is adapted to conduct hot gases between the chambers, while the chambers conduct air from the inlet to the outlet ports.

In testimony whereof I have signed my name to this specification.

CHARLES D. MOSHER.